May 12, 1970　　　M. M. SCHINDELMAN　　　3,511,161
SELECTING THE AIR SOURCE FOR AN AIRCRAFT SUPERCHARGER
Filed Nov. 15, 1968　　　　　　　　　　　　　　　2 Sheets-Sheet 1

INVENTOR
MARC M. SCHINDELMAN
BY Edmund C. Meisinger
ATTORNEY

United States Patent Office 3,511,161
Patented May 12, 1970

3,511,161
SELECTING THE AIR SOURCE FOR AN AIRCRAFT SUPERCHARGER
Marc M. Schindelman, West Hartford, Conn., assignor to United Aircraft Corporation, East Hartford, Conn., a corporation of Delaware
Filed Nov. 15, 1968, Ser. No. 776,194
Int. Cl. B64d 13/00
U.S. Cl. 98—1.5                    9 Claims

ABSTRACT OF THE DISCLOSURE

A system is disclosed wherein aircraft ram air or jet engine bleed air can be selected as sources of flow needed to maintain the aircraft cabin environment. Two parameters govern switching from ram air to engine bleed air and two separate parameters govern switching from engine bleed air to ram air. Switching to bleed air depends on a full open signal from the throttling vanes at the inlet of a compressor and a demand for increased flow. Bleed air remains the source of air until ram air is a satisfactory source which is assured by arming the circuit that governs switching to ram air by determining that bleed air is the source and by determining that a critical pressure differential is above a preselected value.

BACKGROUND OF THE INVENTION

Field of art

This invention relates to aircraft cabin environmental control systems and more specifically relates to an improved system for selecting the air source for the aircraft cabin.

Description of the prior art

Conventional aircraft cabin air pressurization systems use bleed air from the engine compressor to supply air for the cabin air-conditioning system. Systems have been devised for shifting from a low pressure stage air supply to a high pressure stage air supply when the former was inadequate for supplying the required airflow during a particular flight condition. To operate efficiently, air has been obtained from different pressure level sources so as not to waste energy as would occur if only the high pressure source were used since the high pressure source would provide more air and pressure than would be required during most flight conditions. The high pressure source is, however, required at various operating modes, for example, at low aircraft speed and low engine power. Therefore, providing temperature and pressure conditioned air to aircraft cabins for the comfort and safety of the occupants has long been a critical requirement in the design of high speed jet airliners. Altitude, temperature, pressure, passenger loading and prior flight history are primary factors in dictating the flow required for the maintaining of a desirable cabin environment. In providing cabin air for an aircraft, bleed air from the aircraft engine compressor is cooled by a heat sink such as provided by aircraft ram air in order to provide a cooled and pressurized air supply for the aircraft cabin. Stability, reliability, low operating cost, and weight present problems in the design of a practical environmental control system. The control of the system should be as automatic as possible.

SUMMARY OF THE INVENTION

It is an object of this invention to provide a novel system for selecting the source of cabin air over the entire envelope flight conditions.

Another object of this invention is the provision of a system whereby a low pressure or a high pressure source of air may be selected as the source of cabin air as required while maintaining a minimum band, to prevent cycling between the sources, when high pressure air is selected when low pressure air is satisfactory.

A further object of this invention is the provision of an air source selecting control, wherein certain parameters are utilized to govern switching from low pressure air to high pressure air and independent parameters are utilized to govern switching from high pressure to low pressure air and the parameters can be optimized independently. The system can be designed, for all practical purposes, so that flow will not be deficient and high pressure air will not be used where low pressure air is sufficient.

It has now been found that the foregoing and related objects and advantages may be readily obtained in a novel air source switching system. The overall system utilizes a centrifugal compressor having inlet pre-swirl guide vanes for throttling the air supply. Low pressure air and high pressure air are alternate sources of cabin air. The inlet guide vanes modulate the air entering the compressor and operate responsive to a flow sensor downstream of the compressor. As the demand for flow increases, the inlet guide vanes open permitting an increased flow to the compressor and to the cabin. Whenever the low pressure air supply proves unsatisfactory and the pre-swirl vanes are full open, the control, sensing the unsatisfied demand, signals an air shut-off valve thereby allowing high pressure air to enter the system.

The change from high pressure air back to low pressure air is based upon independent parameters. When operating on bleed air, I have found that the low pressure source of air is satisfactory to supply cabin air whenever a pressure differential, $P_3-P_1$, is less than a positive constant. A second pressure differential, $P_2-P_1$, is needed to determine when the high pressure source supplies the air. Thus, these two pressure differentials can be uniquely combined to assure that satisfactory low pressure air is available and to determine when it is permissible to switch from high pressure air back to low pressure air. In a preferred embodiment, differential pressure switches close and thereby transmit a signal to a shut-off valve latching device to allow the shut-off valve to close thereby cutting off the high pressure supply.

DESCRIPTION OF THE PREFERRED EMBODIMENT

Figure 1:
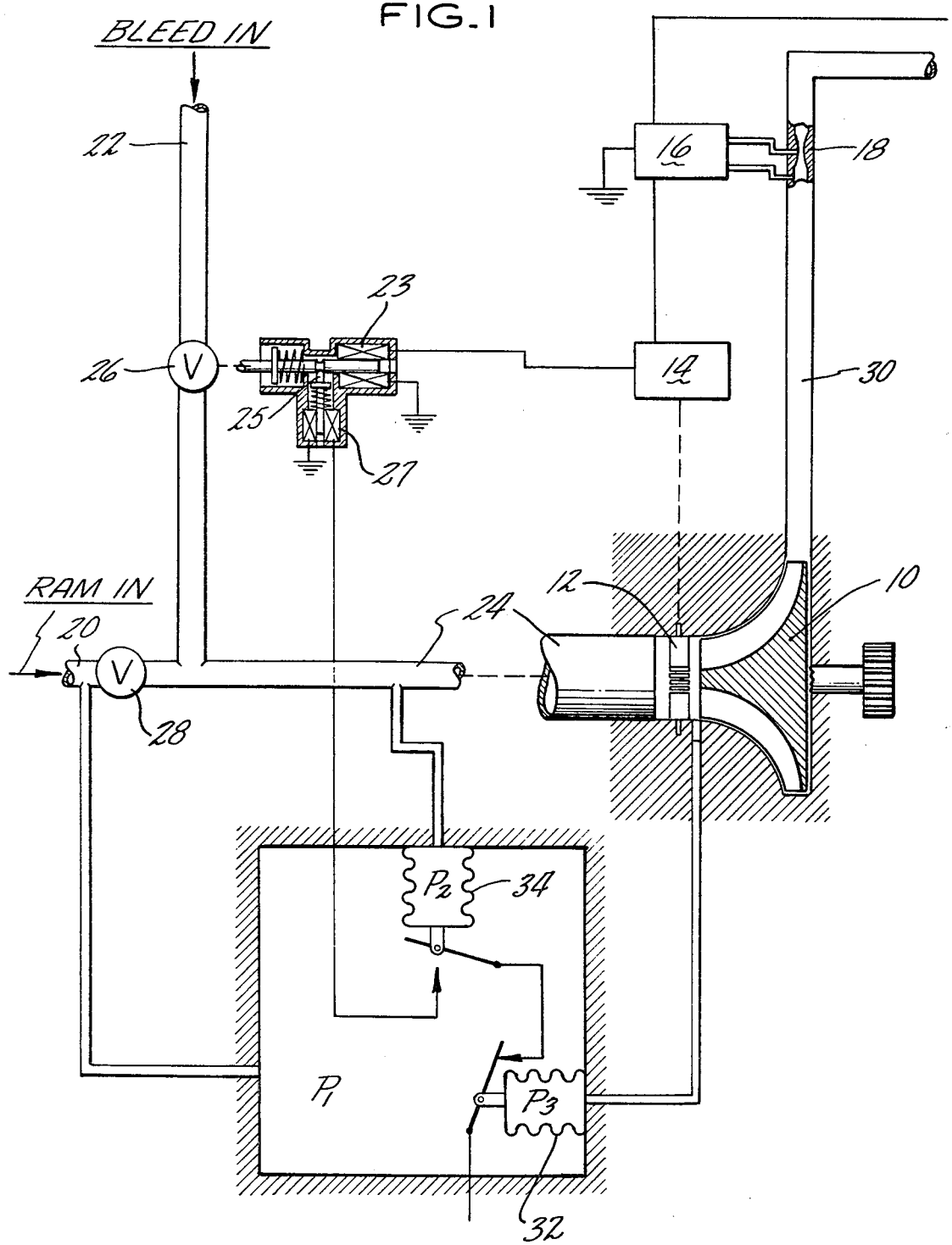
FIG. 1 is a schematic view of the invention showing the adaptation of the pressure differential switches to a control for an aircraft cabin air supply system.

Referring briefly to FIG. 1, a centrifugal compressor 10 is shown having variable inlet pre-swirl guide vanes 12 which may be the type shown in the patent to Wood 3,289,919. Power is supplied to the compressor through an auxiliary drive system (not shown) wherein power may be taken from the accessory drive mechanism of an aircraft gas turbine power plant. Actuator 14 controls the position of the inlet pre-swirl guide vanes 12 which throttle the air coming into the compressor. Actuator 14 responds to a signal from the flow-control computer 16. In this installation, pre-swirl vanes are preferred over an ordinary throttle because of a lower power requirement and a lower temperature rise through the compressor. A flow sensor 18, located in the cabin air supply conduit 30, generates an absolute pressure signal proportional to weight flow. The signal from the flow sensor is transmitted to the flow control computer 16 which compares the actual flow with a predetermined flow schedule and in turn transmits a signal to the actuator 14 for the pre-swirl guide vanes to maintain the actual flow in accordance with the schedule. Air is provided through conduit 24 past the pre-swirl guide vanes 12 to the compressor 10. The normal source of air is aircraft ram air supplied through conduit 20 to avoid use of bleed air when possible. Analysis of the aircraft flight requirements reveals that under certain flight conditions, aircraft ram air does not provide an adequate supply of air. Hence, engine bleed air is an alternate source of air at a higher pressure. In this system, engine bleed air is supplied through conduit 22. A bleed air shut-off valve 26 is provided in the conduit 22 to cut off bleed air whenever ram air is a satisfactory air source. The bleed air shut-off valve opens responsive to an electrical signal transmitted to solenoid 23. Once the valve opens, latch 25 holds the valve open until the latch 25 receives an independent closing signal through solenoid 27.

When the system is operating on ram air, the air source is conduit 20. The weight flow through the compressor is sensed by the flow sensor 18 downstream of the compressor. An actual flow signal is sent to the flow control computer 16. If the control computer 16 schedules an increase in flow, a signal is transmitted from the computer to the actuator 14 which adjusts the pre-swirl guide vanes to the compressor to an increased or greater open position. Thus, the throttling through the swirl vanes is reduced and greater flow is permitted into and out of the centrifugal compressor 10. As even greater demands for flow are required and transmitted by the flow control computer, the pre-swirl vanes are opened further until a maximum flow setting position is reached. The maximum open position arms the opening circuit leading to the bleed air shut-off valve. On a signal for still further flow increases, the signal is transmitted to the bleed air shut-off valve which opens allowing high pressure air to enter the system. Summarizing, two events must occur to change from ram air to bleed air. First, the pre-swirl vanes must be full open and the flow control computer must signal for additional flow. These two events result in an opening signal to the bleed air shut-off valve which, upon opening, is self-latched into the open position.

A check-valve 28 is provided in the ram air duct 20. When the system is operating on ram air, the check-valve 28 is open and the bleed air shut-off valve is closed. During the transient, the shut-off valve opens and bleed air begins to flow in the conduit 22 causing an increase in the pressure in conduit 24. The pressure down stream of the check-valve 28 increases causing the check-valve 28 to close to prevent backflow through the ram air conduit 20. The flow through the compressor and the downstream conduit 30 increases. The flow sensor senses the increased flow and transmits a reduced vane position signal to the pre-swirl guide vanes so as to move the vanes toward the closed position and throttle the air entering the compressor. While the bleed air remains as the source of cabin air, changes in the flow requirements are met by similar changes in the pre-swirl guide vane position.

Figure 2:
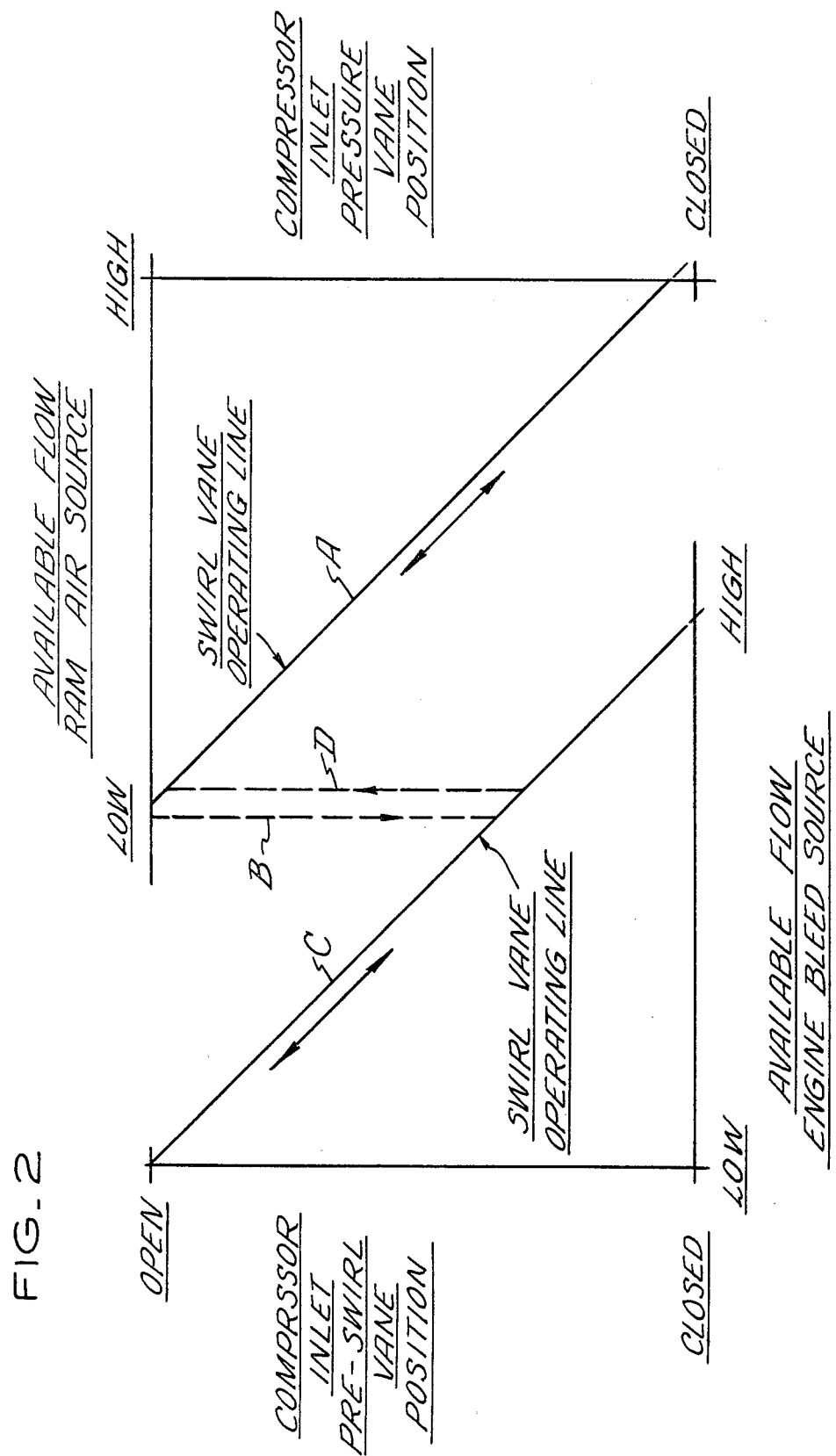
FIG. 2 is a graphical presentation of the flow schedule associated with utilizing independent parameters to govern switching.

As shown in FIG. 2, when the system is operating on ram air, the actual flow changes in accordance with schedule A. If the air demand increases, the throttling vanes open to allow more air to enter the compressor. Once the maximum open vane position is reached, the ram air source is unable to supply more air. Upon a greater demand, the system automatically switches to the engine bleed air or high pressure source. This is illustrated by following schedule A to the maximum open position where a demand for more flow cannot be satisfied since the vanes are full open. The flat at the upper end of the schedule represents an unsatisfied demand which causes the switching to bleed air along transition line B to allow the system to operate on bleed air in accordance with schedule C. As above stated, as soon as the bleed air produces an increased flow through sensor 18, the computer adjusts the inlet vanes to admit the proper amount of air to the compressor.

The bleed air shut-off valve closes in response to an electric signal. The differential pressure switches 32 and 34 control the closing mode of the shut-off valve. These switches are in series and both must be closed in order to actuate the closing solenoid 27 to release the latch 25 associated with valve 26. The first pressure differential switch 32 is responsive to the pressure difference $P_3-P_1$ where $P_3$ is the pressure between the pre-swirl guide vanes and the centrifugal compressor and $P_1$ is the pressure in the ram air conduit 20. $P_3$ may be simply defined as compressor inlet pressure. The second pressure differential switch is responsive to $P_2-P_1$ where $P_2$ is defined as the pressure in conduit 24 upstream of the pre-swirl guide vanes or defined simply as the throttle inlet pressure. As previously mentioned, when the shut-off valve 26 is open, flow is controlled by the pre-swirl guide vanes just as when the system is operating on ram air. When flight conditions change so that ram air is a satisfactory source, the pressure differential $P_3-P_1$ decreases and the first switch closes. The first switch is normally open and closes whenever $P_3-P_1$ is less than or equal to selected value. The single determination of the pressure differential $P_3-P_1$ being less than or equal to a selected value is not a sufficient condition to schedule the closing of the bleed shut-off valve since this pressure differential will exist whenever the system is operating on ram air and would, of itself, supply a continuous closing signal even when ram air is not a satisfactory air source. If the system is operating on bleed air during a flight mode where ram air would be satisfactory, $P_3$ may be slightly greater than $P_1$. Analysis of numerous flight conditions show that whenever the system is on bleed air, if $P_3-P_1$ is less than a particular value to cover all flight conditions, approximately 1 p.s.i., ram air is a satisfactory air source. Further, as long as the pressure differential is accetpable, the ram air is a satisfactory source since ram air is cooler and more dense than bleed air. Thus, at the appropriate pressure differential, the ram source is capable of supplying the required mass flow to the cabin. This analysis was based on pure throttling and the absolute numerical value may necessarily vary.

If a single switch were used to govern switching to low pressure air, the single switch would normally be closed and would continually transmit a closing signal since $P_3-P_1$ is generally less than 1 p.s.i. when ram air is the source. Therefore, a single switch could not be used as a sole means of determining when the closing signal should be sent to the bleed air shut-off valve. For this reason, a second switch 34 must be included in the switching from bleed to ram air circuit. The second switch is responsive to the pressure differential $P_2-P_1$. This switch is normally open and closes whenever the pressure differential $P_2-P_1$ is greater than another selected value, generally about 3 p.s.i. This pressure differential is greater than 3 p.s.i. only when the system is operating on bleed air. Consequently, the combination of two pressure differential switches provides both the necessary and sufficient conditions to switch from bleed air to ram air. When these switches are both closed, the switching circuit is utilized to actuate the closing solenoid 27 to release the latch 25 for the bleed air shut-off valve 26. It should be noted that the second $P_2-P_1$ switch could be replaced by other devices of arming the closing circuit as long as the devices function responsive to or when the high pressure source is supplying the flow.

As an example of changing from bleed air to ram air, the bleed air shut-off valve is open and flow is controlled by the pre-swirl vane actuator 14. When conditions change so that ram air is again a satisfactory source, $P_3-P_1$ decreases and the first switch 32 closes. Since bleed air was the source of air and $P_2-P_1$ is greater than a constant, the second switch 34 is already closed and current is transmitted to the closing solenoid 27 allowing the valve 26 to close.

With refererence to FIG. 2, when bleed air is the source of flow, the flow is regulated in accordance with schedule C. As the throttling vanes close, the available flow is high and the pressure differential $P_3-P_1$ decreases. Since bleed air is the source, whenever $P_3-P_1$ becomes less than approximately 1 p.s.i., the system switches along transition line D to allow the system to operate on ram air. It is evident that the transition from bleed to ram air depends upon a pressure differential and the throttle vanes do not necessarily have to be in the closed position.

This control scheme has been selected over other schemes because it utilizes true mass flow sensing and flow control is always maintained by the same device. In addition, both ram and bleed air can be throttled where necessary by the pre-swirl vanes which results in a significant power reduction. Since different parameters are sensed to govern switching from bleed to ram or from ram to bleed air, the optimum parameters for each can and have been selected. FIG. 2 shows the shut-off valve schedule on a graphical basis. Inspection of this figure shows that the switching path from the ram to bleed air source is not the same as the switching path from the bleed to ram air source. The utilization of the optimum parameters for switching from bleed to ram or from ram to bleed results in the maintenance of a minimum band where bleed air is selected when ram air is satisfactory.

The preferred embodiment discloses a switching system which is independent of other aircraft control systems and which is automatic as possible. The system for all practical purposes has been designed so that flow will not be deficient and bleed air will not be used where ram air would suffice except in the narrow pressure band between the lines B and D in FIG. 2. It is evident that the pressures specified and the use of the specific bellows switches have been tailored to a specific application by way of illustrating the invention and not by way of limitation.

Although the invention has been shown and described with respect to a preferred embodiment, it should be understood by those skilled in the art that various changes and omissions in the form and detail may be made without departing from the spirit and scope of the invention.

What I claim is:

1. An air supply system including separate sources of air at higher and lower pressure levels, a compressor having an inlet and air throttling means for admitting air thereto, the sources supplying air to the inlet, a valve regulating the flow of air from the higher pressure source to the air throttling means, means for opening the valve in response to increased and unsatisfied flow demand, means for closing the valve, the closing means including a first switch responsive to the pressure differential as defined as the compressor inlet pressure less the pressure in the lower pressure source line, and including separate means for arming the closing means, the separate means being responsive to flow in the higher pressure source line.

2. A system as in claim 1, wherein latching means holds the valve open, the latching means being released by a closing signal from the closing means.

3. A system as in claim 2, wherein the separate means for arming the closing means is a switch responsive to the pressure differential defined as the throttle inlet pressure less the low pressure source pressure.

4. A system for selecting the source of air, the system having two sources of air at higher and lower pressure levels, a compressor having pre-swirl guide vanes for admitting air thereto and alternatively connected to the sources, a valve regulating the high pressure source to the pre-swirl guide vanes, the valve opening responsive to increased and unsatisfied flow demand, means for closing the valve, the closing means including a first switch and a second switch, the first switch being responsive to $P_3-P_1$, where $P_3-P_1$ is defined as the compressor inlet pressure less the low pressure source pressure, the second switch being responsive to $P_2-P_1$, where $P_2-P_1$ is defined as the throttle inlet pressure less the low pressure source pressure, the valve closing solely when both switches are closed.

5. A system as in claim 4, wherein the valve includes latching means, the latching means engaging when the valve opens thereby preventing the valve from closing until a closing signal is received through the switches to release the latching means.

6. A system as in claim 5, wherein the low pressure source includes a check valve to prevent back flow to the low pressure source when operating on air from the high pressure source.

7. A system as in claim 6, wherein the first and second switches are pneumatically actuated bellows switches, the first switch being normally closed and the second switch being normally open.

8. In an aircraft air-conditioning system having two sources of air at higher and lower pressure levels, the system including a compressor having inlet air throttling means, the method of selecting the source of air comprising:

switching from the low pressure source to the high pressure source when the air throttling means are at the maximum flow setting and an increased flow is required; and switching from the high pressure source to the low pressure source as a function of a first pressure differential $P_3-P_1$, being less than a constant, and a second pressure differential $P_2-P_1$, being greater than a constant, where $P_3-P_1$ is defined as the compressor inlet pressure less the low pressure source pressure and $P_2-P_1$ is defined as the throttle inlet pressure less the low pressure source pressure.

9. The method of claim 8, including:

selecting the shifting schedules so that switching to the low pressure source occurs when $P_2-P_1$ is greater than approximately 3.0 p.s.i. and $P_3-P_1$ is less than or equal to approximately 1 p.s.i.

References Cited

UNITED STATES PATENTS

| 2,734,356 | 2/1956 | Kleinhans | 98—1.5 |
| 3,192,848 | 7/1965 | Townsend | 98—1.5 |
| 3,367,256 | 2/1968 | Townsend | 98—1.5 |
| 3,441,045 | 4/1969 | Malone | 137—114 |

MEYER PERLIN, Primary Examiner

U.S. Cl. X.R.

62—401